United States Patent
Lee et al.

(10) Patent No.: US 11,221,053 B2
(45) Date of Patent: Jan. 11, 2022

(54) SYSTEM FOR MONITORING VIBRATION-ISOLATED FOUNDATION

(71) Applicants: Samsung Display Co., Ltd., Yongin-si (KR); V1 Co., Ltd., Asan-si (KR)

(72) Inventors: Eun Sam Lee, Asan-si (KR); Hae Dong Park, Asan-si (KR); Min Chan Kim, Cheonan-si (KR); Kuk Hyun Ryu, Asan-si (KR); Kyung Ho Song, Asan-si (KR); Joon Hwa Lee, Asan-si (KR)

(73) Assignees: Samsung Display Co., Ltd., Yongin-si (KR); V1 Co., Ltd., Asan-si (KR)

( * ) Notice: Subject to any disclaimer, the term of this patent is extended or adjusted under 35 U.S.C. 154(b) by 254 days.

(21) Appl. No.: 16/386,107

(22) Filed: Apr. 16, 2019

(65) Prior Publication Data
US 2019/0331195 A1    Oct. 31, 2019

(51) Int. Cl.
| F16F 15/00 | (2006.01) |
| F16F 15/023 | (2006.01) |
| F16F 15/16 | (2006.01) |
| F16F 15/14 | (2006.01) |

(52) U.S. Cl.
CPC ............ *F16F 15/023* (2013.01); *F16F 15/00* (2013.01); *F16F 15/145* (2013.01); *F16F 15/164* (2013.01)

(58) Field of Classification Search
CPC ...... F16F 15/023; F16F 15/145; F16F 15/164; F16F 15/00; F16L 55/035; F16L 55/1016; F16L 55/1091; F16L 55/00; F16L 55/135
USPC ............................ 248/638, 636, 562, 566, 61
See application file for complete search history.

(56) References Cited

U.S. PATENT DOCUMENTS

| 5,876,012 | A  * | 3/1999 | Haga ................... | F16F 15/0275 248/550 |
| 6,038,013 | A  * | 3/2000 | Ohsaki ............... | G03F 7/70716 248/550 |
| 6,375,147 | B1 * | 4/2002 | Radziun ............. | G01R 33/3854 248/550 |
| 7,484,706 | B2 * | 2/2009 | Rebolledo ............... | F16F 1/128 248/610 |
| 8,829,899 | B2 * | 9/2014 | Polzer .................. | G01R 33/022 324/246 |

(Continued)

FOREIGN PATENT DOCUMENTS

KR    1990-0008693  B1    11/1990

*Primary Examiner* — Nkeisha Smith
(74) *Attorney, Agent, or Firm* — Lewis Roca Rothgerber Christie LLP (57) ABSTRACT

In a system for monitoring a vibration-isolated foundation, the system includes: an air pressure monitoring system for monitoring air pressure supplied to air mounts of the vibration-isolated foundation, wherein the air pressure monitoring system includes: a plurality of air ports configured to receive air to be supplied to the air mounts; a plurality of pressure sensors, each of the pressure sensors being configured to measure the pressure of the air supplied to a corresponding one of the air ports and to output the measured pressure as a sensing signal; a control unit configured to receive the sensing signal from each of the pressure sensors and to output a control signal according to a measured value of each of the pressure sensors; and a notification unit configured to operate according to the control signal of the control unit.

18 Claims, 6 Drawing Sheets

(56) References Cited

U.S. PATENT DOCUMENTS

| | | | | |
|---|---|---|---|---|
| 8,921,735 | B2* | 12/2014 | Helf | F04C 18/16 |
| | | | | 219/133 |
| 9,346,357 | B2* | 5/2016 | Roberts | B60K 35/00 |
| 9,788,446 | B1* | 10/2017 | Townsend | H05K 7/06 |
| 10,751,490 | B2* | 8/2020 | Martin | A61M 16/026 |
| 10,850,782 | B2* | 12/2020 | Keatley | B60D 1/64 |
| 2002/0005108 | A1* | 1/2002 | Ludwig | G06F 3/0488 |
| | | | | 84/600 |
| 2008/0283718 | A1* | 11/2008 | Tsuge | F16F 15/08 |
| | | | | 248/562 |
| 2009/0050779 | A1* | 2/2009 | Arimoto | H01L 21/67253 |
| | | | | 248/562 |
| 2010/0001445 | A1* | 1/2010 | Maruyama | F16F 15/0275 |
| | | | | 267/113 |
| 2013/0200248 | A1* | 8/2013 | Polzer | F16F 15/02 |
| | | | | 248/550 |
| 2016/0361959 | A1* | 12/2016 | Keatley | B62D 53/08 |
| 2018/0195473 | A1* | 7/2018 | Irwin | F02M 35/08 |
| 2020/0217546 | A1* | 7/2020 | Seaton | F24F 11/58 |

* cited by examiner

SYSTEM FOR MONITORING
VIBRATION-ISOLATED FOUNDATION

CROSS-REFERENCE TO RELATED
APPLICATION

This application claims priority to and the benefit of Korean Patent Application No. 10-2018-0048730, filed on Apr. 26, 2018, in the Korean Intellectual Property Office, the disclosure of which is incorporated herein by reference in its entirety.

BACKGROUND

1. Field

Aspects of some example embodiments of the present disclosure relate to a system for monitoring a vibration-isolated foundation.

2. Description of the Related Art

Generally, keeping ambient vibrations to a minimum is very important for most equipment related to product production (e.g., measuring equipment, polishing devices, etc.) in the manufacture of ultra-precision products such as semiconductors and OLEDs. This is to ensure high quality of products. To this end, a vibration-isolated foundation using air mounts may be utilized. A technology that applies pneumatic springs as air mounts, for example, may be utilized as a technology related to a vibration-isolated foundation.

However, with the above technology, there is a possibility that a worker in an upper part will fail to recognize an abnormality in pneumatic springs corresponding to air mounts or damage to the pneumatic springs arising from carelessness during unplanned work on a lower part. Accordingly, this can cause an accident and significantly reduce the reliability of leveling and vibration isolation operations.

In addition, over-lifting caused by a displacement that exceeds a limit can seriously undermine the safety of workers and cause malfunction or damage of installed equipment.

The Background section of the present Specification includes information that is intended to provide context to example embodiments, and the information in the present Background section does not necessarily constitute prior art.

SUMMARY

Aspects of some example embodiments of the present disclosure relate to a system for monitoring a vibration-isolated foundation, and for example, to a system for monitoring a vibration-isolated foundation. According to some example embodiments, the system may enable a line operator to quickly recognize an abnormality in the supply of air to air mounts, an abnormality in mechanical parts of the air mounts, or the erroneous operation of the air mounts due to a worker's carelessness, thereby preventing or reducing instances of malfunction of precision production equipment, preventing or reducing instances of manufacturing defects of products, ensuring or improving the safety of workers and the protection of precision equipment, and preventing or reducing instances of secondary accidents.

Some example embodiments may enable workers to quickly recognize an abnormality in the supply of air to air mounts or damage to the air mounts, thereby ensuring or improving the safety of the workers, preventing or reducing accidents, and enabling follow-up measures to be quickly taken to ensure the reliability of leveling and vibration isolation operations.

Some example embodiments may prevent or reduce instances of over-lifting due to a displacement that exceeds a limit, thereby ensuring or improving the safety of workers and making it possible to recognize and prevent (or reduce instances of) malfunction of installed equipment in real time.

However, aspects of the present disclosure are not restricted to the one set forth herein. The above and other aspects of the present disclosure will become more apparent to one of ordinary skill in the art to which the present disclosure pertains by referencing the detailed description of the present disclosure given below.

According to an aspect of some example embodiments of the present disclosure, there is provided a system for monitoring a vibration-isolated foundation. The system includes an air pressure monitoring system for monitoring air pressure supplied to air mounts of the vibration-isolated foundation, wherein the air pressure monitoring system comprises: a plurality of air ports which receive air to be supplied to the air mounts; a plurality of pressure sensors, each measuring the pressure of the air supplied to a corresponding one of the air ports and outputting the measured pressure as a sensing signal; a control unit which receives the sensing signal from each of the pressure sensors and outputs a control signal according to a measured value of each of the pressure sensors; and a notification unit which operates according to the control signal of the control unit.

According to an aspect of some example embodiments of the present disclosure, there is provided a system for monitoring a vibration-isolated foundation. The system includes an air pressure monitoring system for monitoring air pressure supplied to a plurality of air mounts of the vibration-isolated foundation, wherein the air pressure monitoring system includes: a plurality of air ports configured to receive air to be supplied to the air mounts; a plurality of pressure sensors, each of the pressure sensors being configured to measure the pressure of the air supplied to a corresponding one of the air ports and to output the measured pressure as a sensing signal; and a notification unit configured to operate based on the sensing signal of each of the pressure sensors.

BRIEF DESCRIPTION OF THE DRAWINGS

These and/or other aspects will become more apparent and more readily appreciated from the following description of the embodiments, taken in conjunction with the accompanying drawings in which.

DETAILED DESCRIPTION

While the present disclosure is susceptible to various modifications and alternative forms, aspects of some example embodiments are illustrated with reference the drawings and are described in detail herein. It should be understood, however, that the present disclosure is not intended to be limited to the particular example embodiments disclosed herein. Rather, embodiments according to the present disclosure include all modifications, equivalents, and alternatives falling within the spirit and scope of the disclosure and is not limited to the embodiments described below.

Hereinafter, aspects of some example embodiments of the present disclosure will be described in more detail with reference to the accompanying drawings. The same or corresponding elements will be identified by the same reference numerals regardless of numerals in the drawings, and any redundant description thereof will be omitted.

Figure 1:
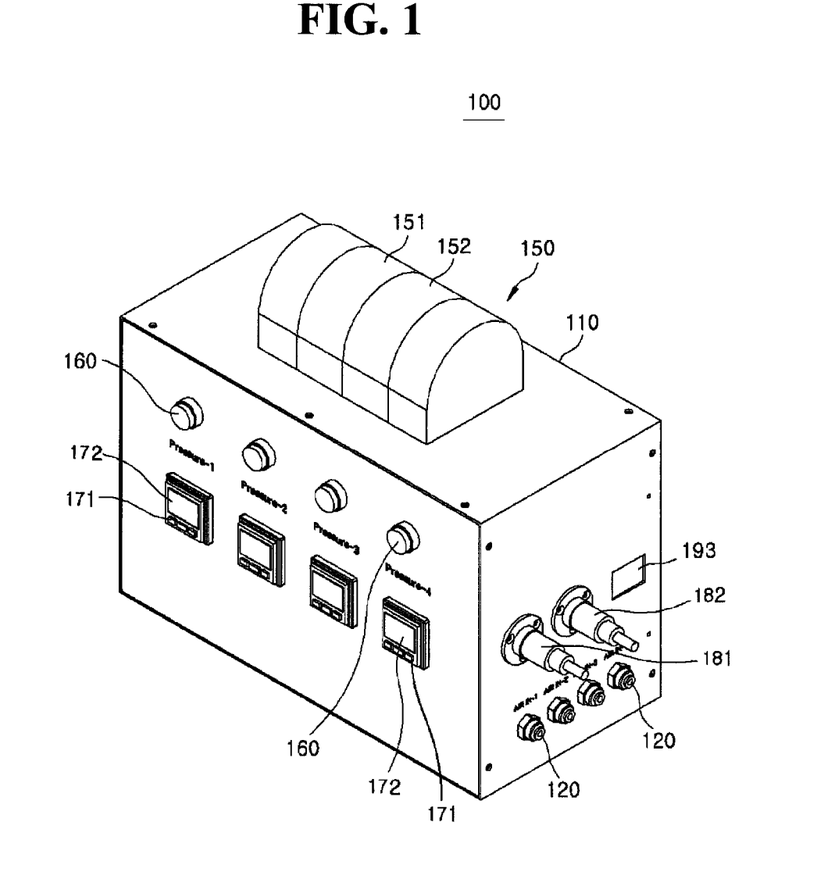
FIG. 1 is a perspective view of an air pressure monitoring system in a system for monitoring a vibration-isolated foundation according to some example embodiments.
Figure 2:
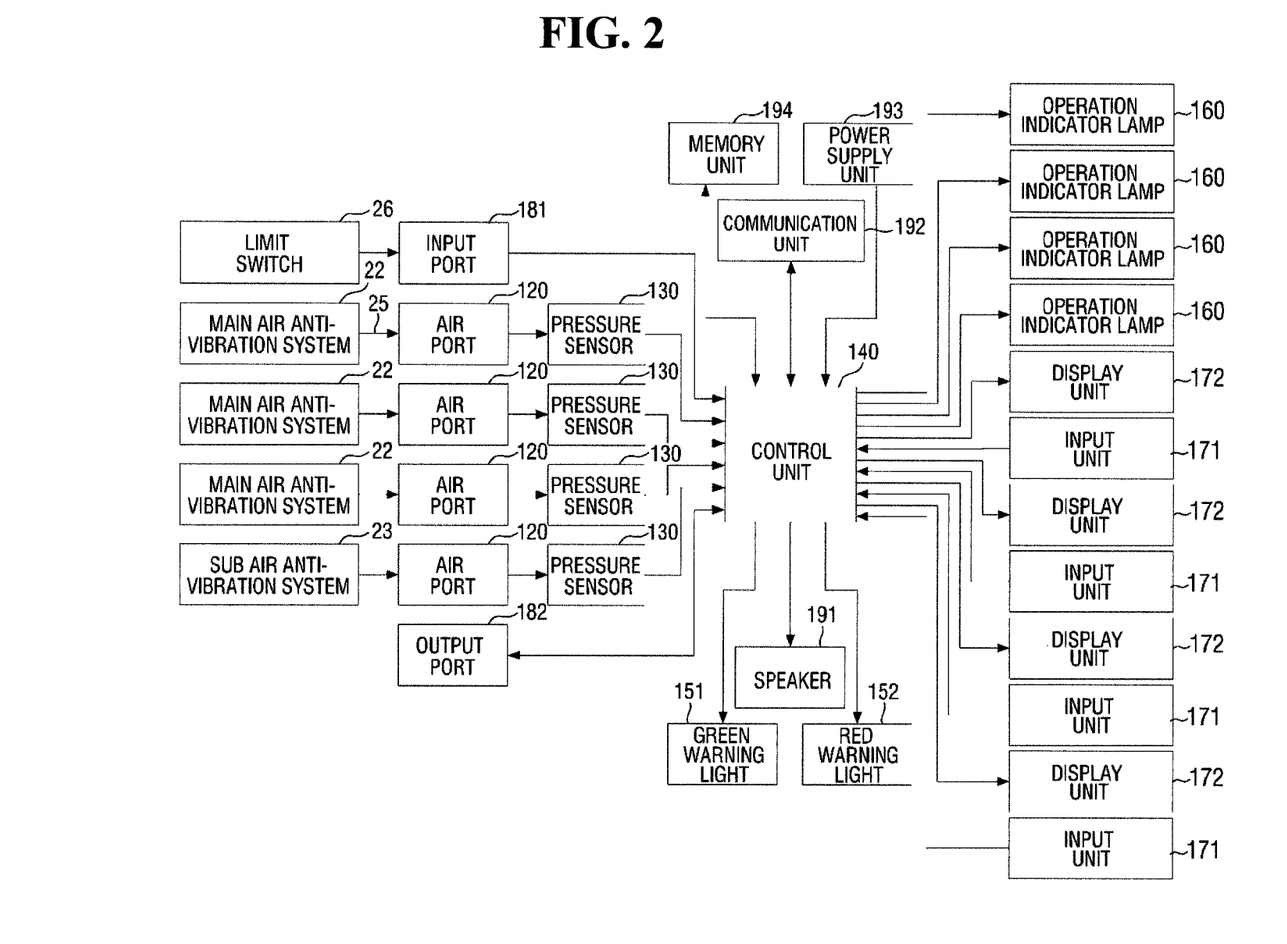
FIG. 2 illustrates the configuration of the air pressure monitoring system in the system for monitoring a vibration-isolated foundation according to some example embodiments.

FIG. 1 is a perspective view of an air pressure monitoring system 100 in a system for monitoring a vibration-isolated foundation according to some example embodiments. FIG. 2 illustrates the configuration of the air pressure monitoring system 100 in the air pressure monitoring and over-lifting preventing system for keeping a vibration-isolated foundation level according to some example embodiments.

Figure 3:
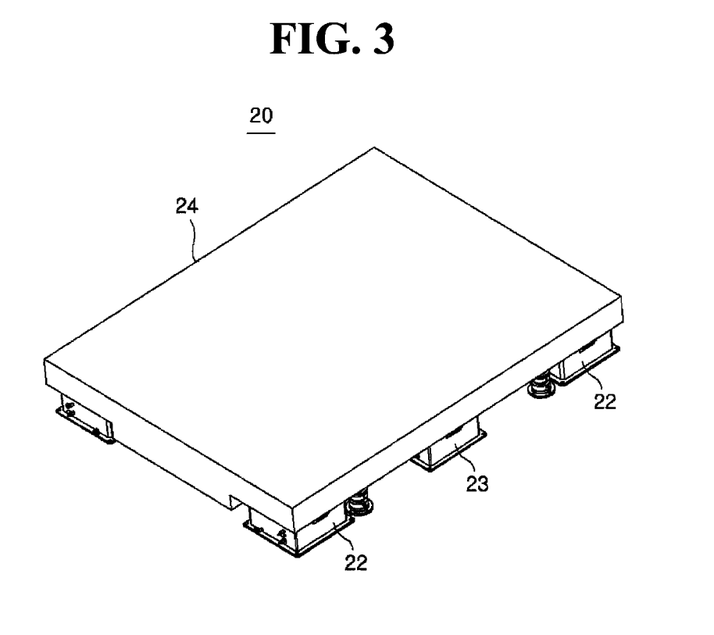
FIG. 3 is a perspective view of an example of a vibration-isolated foundation used in the system for monitoring a vibration-isolated foundation according to some example embodiments.

Referring to FIGS. 1 and 2, the system for monitoring a vibration-isolated foundation according to some example embodiments may include the air pressure monitoring system 100 for monitoring air pressure supplied to air mounts 22 and 23 (or main and sub air anti-vibration mounts) (see also FIG. 3) of a vibration-isolated foundation 20 (see FIG. 3).

Figure 4:
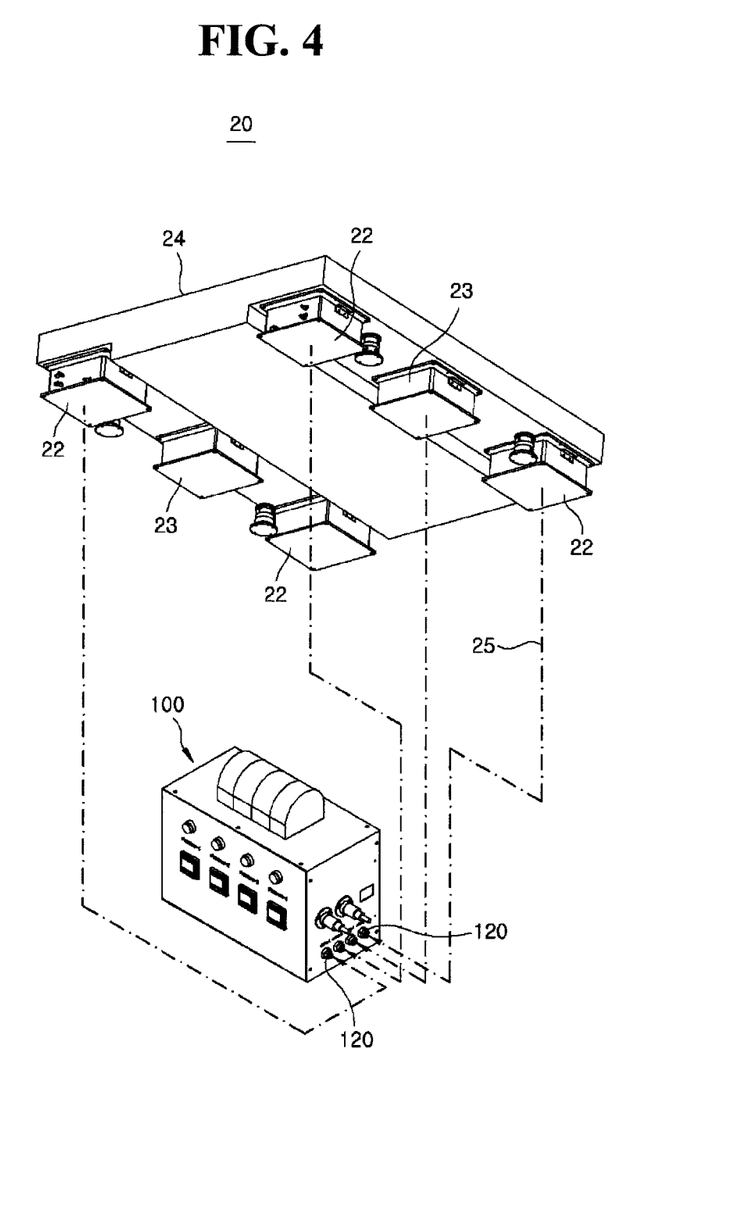
FIG. 4 is a perspective view illustrating an example of the connection of the air pressure monitoring system in the system for monitoring a vibration-isolated foundation according to some example embodiments.
Figure 5:
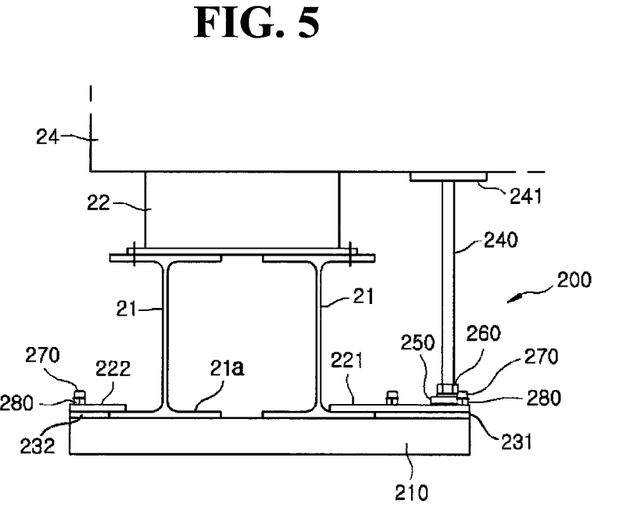
FIG. 5 is a front view illustrating the installation state of an over-lifting preventing stopper in the system for monitoring a vibration-isolated foundation according to some example embodiments.

Referring to FIGS. 3-5, the vibration-isolated foundation 20 to which the system for monitoring a vibration-isolated foundation according to the embodiment is applied may include a plurality of air mounts 22 and 23 installed on installation beams 21 (see FIG. 5) and a vibration isolation platform 24 installed on the air mounts 22 and 23.

The installation beams 21 (see FIG. 5) may be, for example, I-beams. A plurality of installation beams 21 may support each of the air mounts 22 and 23 according to some example embodiments.

Each of the air mounts 22 and 23 adjusts the height of the vibration isolation platform 24 using the pressure of air supplied from the outside. While supporting the vibration isolation platform 24, each of the air mounts 22 and 23 may prevent vibrations from being applied to the vibration isolation platform 24 and level the vibration isolation platform 24 using the pressure of air supplied under the control of a vibration isolation controller, which receives a sensing signal from a height sensor for measuring the height of the vibration isolation platform 24.

The air mounts 22 and 23 may include, according to some example embodiments, a main air mount 22 installed at each corner of the vibration isolation platform 24 to mostly adjust the height of the vibration isolation platform 24 and sub-air mounts 23 installed between the main air mounts 22 to assist in height adjustment of the vibration isolation platform 24.

The vibration isolation platform 24 may provide a place on which precision processing equipment such as semiconductor manufacturing equipment and various other pieces of equipment requiring vibration isolation and leveling can be installed. In some embodiments, the vibration isolation platform 24 may be a reinforced concrete slab structure. Alternatively, the vibration isolation platform 24 may be a slab structure made of various other materials.

As illustrated in FIGS. 1, 2 and 4, the air pressure monitoring system 100 in the system for monitoring a vibration-isolated foundation according to some example embodiments may include air ports 120, pressure sensors 130, a control unit 140, and a notification unit 150.

In some example embodiments, the notification unit 150 may visually provide a warning notification to a user. For example, the notification unit 150 may be a warning light. The notification unit 150 will hereinafter be referred to as a warning light. However, the notification unit 150 is not limited to the warning light and can be implemented as any element through which a user can visually recognize a warning notification.

A plurality of air ports 120 may be provided to receive air to be supplied to the air mounts 22 and 23. As in the current embodiment, four air ports 120 may be provided and connected to at least three main air mounts 22 and a single sub-air mount 23 by air lines 25. The number of the air ports 120 and the connection positions of the air ports 120 with the air mounts 22 and 23 can be changed. The air ports 120 may be arranged on a surface of a casing 110.

Each of the pressure sensors 130 may measure the pressure of air supplied to a corresponding air port 120 and output the measured pressure as a sensing signal. Each of the pressure sensors 130 may output a sensing signal by measuring the pressure of air supplied to a corresponding one of the air mounts 22 and 23 connected respectively to the air ports 120, and the output sensing signal is provided to the control unit 140. The pressure sensors 130 may be installed inside the casing 110 to receive the pressure of air from the air ports 120, like the control unit 140 to be described later.

The control unit 140 may receive a sensing signal from each of the pressure sensors 130 and output a control signal according to a measured value of each of the pressure sensors 130. That is, the control unit 140 may control an emission color of the warning light 150 according to whether the measured value of each of the pressure sensors 130 is outside a range (e.g., a predetermined range). Accordingly, a line manager can easily identify whether the pressure of air supplied to the air mounts 22 and 23 is abnormal through the warning light 150.

A memory unit 194 may be provided in the control unit 140. The memory unit 194 may store a range (e.g., a predetermined range) for measured values of the pressure sensors 130 as a criterion for abnormality detection, other setting values, and various data and programs necessary for operation.

The warning light 150 may operate according to a control signal of the control unit 140. The warning light 150 may include a first warning light 151 and a second warning light 152.

The first warning light 151 may emit light of a first color in response to a control signal of the control unit 140 when the air pressure of the air mounts 22 and 23 is within a normal range. The second warning light 152 may emit light of a second color different from the first color in response to a control signal of the control unit 140 when the air pressure of the air mounts 22 and 23 is outside the normal range. In some embodiments, the first color may be green, and the second color may be red.

The first warning light 151 and the second warning light 152 may be located at highly visible positions, for example, on top of the casing 110.

For ease of description, the first warning light 151 will be referred to as a green warning light, and the second warning light 153 will be referred to as a red warning light, but embodiments according to the present disclosure are not limited thereto.

The air pressure monitoring system 100 may further include operation indicator lamps 160, input units 171, display units 172, an input port 181, a speaker 191, and a communication unit 192.

The operation indicator lamps 160 may respectively indicate operation states of the air mounts 22 and 23 operated by the air supplied to the air ports 120. For example, the operation indicator lamps 160 may respectively indicate the operation states of the air mounts 22 and 23 using light emission or non-emission or the color of emitted light. The number of the operation indicator lamps 160 may correspond to the number of the air ports 120.

The operation indicator lamps 160 may be arranged on an outer surface of the casing 110. For example, under the control of the control unit 140 which receives measured values of the pressure sensors 130, the air mounts 22 and 23 may be connected to the air ports 120, and whether the connected air mounts 22 and 23 are operated by the air supplied may be indicated by the lighting of the operation indicator lamps 160.

The input units 171 may respectively correspond to the pressure sensors 130 so as to set a value (e.g., a predetermined value) for the pressure sensors 130. That is, the input units 171 may be provided to set a normal pressure range for the pressure sensors 130. As in the current embodiment, the input units 171 may be implemented as a plurality of buttons. In some embodiments, the input units 171 may be implemented as various input devices for inputting setting values, such as a touch panel.

The display units 172 may display input values of the input units 171 when the input units 171 are operated and may display measured values of the pressure sensors 130 when the input units 171 are not operated. The display units 172 may be implemented as various display devices provided on the outer surface of the casing 110. A plurality of display units 172 may be provided to respectively correspond to the pressure sensors 130 as in the current embodiment. In some example embodiments, one display unit 172 may be provided to display measured values of all of the pressure sensors 130.

The input port 181 may be provided on the outer surface of the casing 110 to receive a sensing signal of a limit switch 26 installed in the vibration-isolated foundation 20 and to be connected to a signal line of the limit switch 26. The limit switch 26 may be a switch designed to sense whether the displacement of the vibration isolation platform 24 in the vibration-isolated foundation 20 reaches a limited range. Various types of displacement sensors may be used as the limit switch 26. According to some example embodiments, the control unit 140 may control the warning light 150 according to a sensing signal of the limit switch 26 received through the input port 181. For example, when the displacement is within a limited range, the control unit 140 may control the green warning light 151 to be turned on. When the displacement is outside the limited range, the control unit 140 may control the operation of the warning light 150 such that the red warning light 152 is turned on or off even if the pressure of the air mounts 22 and 23 is within a normal range. An output port 182 may be provided on the casing 110 to output the processing result of the control unit 140 and data necessary for monitoring.

The speaker 191 may be provided in the casing 110 and controlled by the control unit 140 to output a warning sound for an auditory effect when the control unit 140 gives a warning through the warning light 150. The speaker 191 may be provided separately from the warning light 150 or may be integrated with the warning light 150.

The communication unit 192 may be controlled by the control unit 140 to perform communication for providing a warning message to a terminal (e.g., a predetermined terminal). To this end, various wired or wireless communication methods may be used, including long-distance communication methods such as wireless LAN (WLAN), Wi-Fi, Wibro, Wimax, high speed downlink packet access (HSDPA), long term evolution (LTE) and LTE-advanced (LTE-A) and short-distance communication methods such as Bluetooth, Zigbee, ultra-wideband (UWB), ANT, Wi-Fi and personal area network (PAN). Here, the terminal may be an information processing and communication device (e.g., a smartphone) that can perform a process (e.g., a predetermined process) by executing an application or program and can perform communication. When the pressure of the air mounts 22 and 23 or the displacement measured by the limit switch 26 is outside a range (e.g., a predetermined range), the control unit 140 may control a warning message (e.g., a predetermined warning message) to be provided to the terminal as a text message or as various messages of a predetermined form through social network service (SNS).

Figure 6:
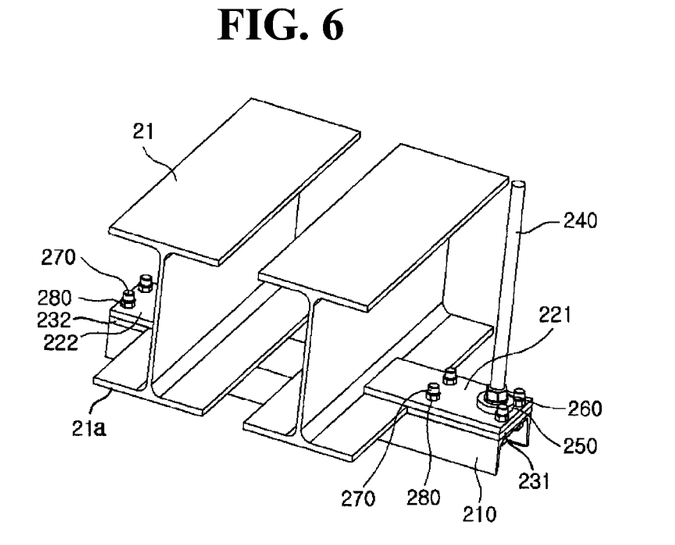
FIG. 6 is a perspective view of the over-lifting preventing stopper in the system for monitoring a vibration-isolated foundation according to some example embodiments.
Figure 7:
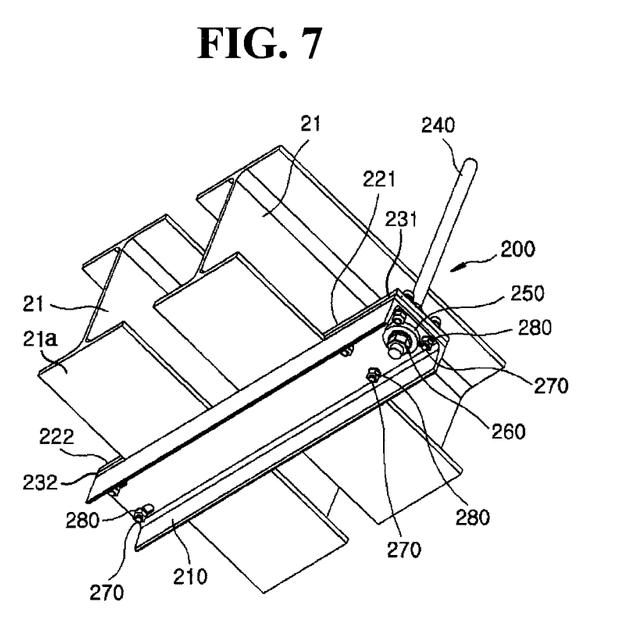
FIG. 7 is a bottom perspective view of the over-lifting preventing stopper in the system for monitoring a vibration-isolated foundation according to some example embodiments.

Referring to FIGS. 5 through 7, the system for monitoring a vibration-isolated foundation according to some example embodiments may further include an over-lifting preventing stopper 200 for limiting a height to which the vibration isolation platform 24 supported by the air mounts 22 and 23 is lifted from the installation beams 21 on which the air mounts 22 and 23 are installed. The over-lifting preventing stopper 200 may include a lower support plate 210, first and second upper support plates 221 and 222, first and second spacers 231 and 232, a main bolt 240, support washers 250, adjusting nuts 260, fixing bolts 270, and fixing nuts 280. In some example embodiments, the over-lifting preventing stopper 200 may be installed on the side of the main air mounts 22. However, the over-lifting preventing stopper 200 may also be installed on the side of the sub-air mounts 23.

The lower support plate 210 may be arranged horizontally on bottom surfaces of the installation beams 21. For example, the lower support plate 210 may be a steel material having a "⊏"-shaped cross section.

The first and second upper support plates 221 and 222 may respectively be located on both sides of top surfaces of lower flanges 21a of the installation beams 21 and extend onto the lower support plate 210. The first and second upper support plates 221 and 222 may be made of, e.g., a metal plate.

The first and second spacers 231 and 232 may be interposed between the first and second upper support plates 221 and 222 and the lower support plate 210, respectively. To this end, the first and second spacers 231 and 232 may be plate-shaped and made of, for example, a metal plate.

The main bolt 240 is fixed to a bottom surface of the vibration isolation platform 24 to perpendicularly extend downward and vertically slidably passes through the first upper support plate 221, the first spacer 231 and the lower support plate 210.

The main bolt 240 may be fixed to a fixing member 241, which is fixed to the bottom surface of the vibration isolation platform 24 using various methods such as bolting and welding, by using various methods such as welding and screwing such that the main bolt 240 perpendicularly extends downward.

The support washers 250 are inserted onto the main bolt 240 and respectively supported on upper and lower sides of the main bolt 240 with the first upper support plate 221, the first spacer 231 and the lower support plate 210 interposed between the support washers 250. The support washers 250 are provided in a pair and respectively increase the support areas of the adjusting nuts 260.

A pair of adjusting nuts 260 are provided to correspond to the support washers 250, respectively. The adjusting nuts 260 are screwed to the main bolt 240 and respectively located on the upper support washer 250 and under the lower support washer 250 to restrict the vertical movement of the first upper support plate 221, the first spacer 231 and the lower support plate 210 on the main bolt 240. Therefore, by adjusting the gap between the adjusting nuts 260 on the main bolt 240, it may be possible to limit the range in which the first upper support plate 221 fixed to the installation beam 21, the first spacer 231 and the lower support plate 210 move on the main bolt 240. Accordingly, it may be possible to adjust or limit the height to which the vibration isolation platform 24 is lifted by the air mounts 22 and 23.

The fixing bolts 270 and the fixing nuts 280 may be provided in a plurality of pairs to couple the first upper support plate 221, the first spacer 231 and the lower support plate 210 to each other and couple the second upper support plate 222, the second spacer 232 and the lower support plate 210 to each other.

According to the system for monitoring a vibration-isolated foundation according to some example embodiments of the present disclosure, an air pressure monitoring system enables workers to quickly recognize an abnormality in the supply of air to air mounts or damage to the air mounts. This ensures the safety of the workers, prevents or reduces accidents, and enables follow-up measures to be quickly taken to ensure the reliability of leveling and vibration isolation operations.

In addition, according to some example embodiments of the present disclosure, an over-lifting preventing stopper prevents over-lifting due to a displacement that exceeds a limit. This ensures the safety of workers and makes it possible to recognize and prevent or reduce malfunction of installed equipment in real time.

According to some example embodiments of the present disclosure, it may be possible to enable workers to quickly recognize an abnormality in the supply of air to air mounts or damage to the air mounts, thereby ensuring the safety of the workers, preventing or reducing accidents, and enabling follow-up measures to be quickly taken to ensure the reliability of leveling and vibration isolation operations. In addition, example embodiments may prevent or reduce over-lifting due to a displacement that exceeds a limit, thereby ensuring the safety of workers and making it possible to recognize malfunction of installed equipment in real time.

However, aspects of the present disclosure are not restricted to the one set forth herein. The above and other aspects of the present disclosure will become more apparent to one of ordinary skill in the art to which the present disclosure pertains by referencing the claims, and their equivalents.

While the present disclosure has been described with reference to the accompanying drawings, it should be understood that various changes and modifications may be made without departing from the spirit of the present disclosure. Therefore, the scope of the present disclosure should not be limited to the described embodiments, but should be defined by the following claims and equivalents of the claims.

What is claimed is:

1. A system for monitoring a vibration-isolated foundation, the system comprising:
    an air pressure monitoring system for monitoring air pressure supplied to a plurality of air mounts of the vibration-isolated foundation, wherein the air pressure monitoring system comprises:
        a plurality of air ports configured to receive air to be supplied to the air mounts;
        a plurality of pressure sensors, each of the pressure sensors being configured to measure the pressure of the air supplied to a corresponding one of the air ports and to output the measured pressure as a sensing signal;
        a control unit configured to receive the sensing signal from each of the pressure sensors and to output a control signal according to a measured value of each of the pressure sensors; and
        a notification unit configured to operate according to the control signal of the control unit.

2. The system of claim 1, wherein the notification unit is a warning light.

3. The system of claim 1, wherein the notification unit comprises:
    a first warning light configured to emit light of a first color when the pressure of the air supplied to the air mounts is within a normal range; and
    a second warning light configured to emit light of a second color different from the first color when the pressure of the air supplied to the air mounts is outside the normal range.

4. The system of claim 3, wherein the first color is green, and the second color is red.

5. The system of claim 1, wherein the air pressure monitoring system further comprises a plurality of operation indicator lamps configured to respectively indicate, through light emission, operation states of the air mounts operated by the air supplied to the air ports.

6. The system of claim 1, wherein the air pressure monitoring system further comprises:
    a plurality of input units which respectively correspond to the pressure sensors so as to set a predetermined value for the pressure sensors; and
    a plurality of display units configured to respectively display input values of the input units or the measured values of the pressure sensors.

7. The system of claim 1, further comprising an input port configured to receive a sensing signal of a limit switch installed in the vibration-isolated foundation, wherein the control unit is configured to control the notification unit according to the sensing signal of the limit switch received through the input port.

8. The system of claim 1, further comprising a speaker which is controlled by the control unit to output a warning sound.

9. The system of claim 1, further comprising a communication unit which is controlled by the control unit to perform communication for providing a warning message to a predetermined terminal.

10. The system of claim 1, further comprising an over-lifting preventing stopper configured to limit a height to which a vibration isolation platform supported by the air mounts is lifted from installation beams on which the air mounts are installed, wherein the over-lifting preventing stopper comprises:
    a lower support plate arranged horizontally on bottom surfaces of the installation beams;
    first and second upper support plates which are respectively arranged on both sides of top surfaces of lower flanges of the installation beams and extend onto the lower support plate;
    first and second spacers which are interposed between the first and second upper support plates and the lower support plate, respectively;
    a main bolt which is fixed to a bottom surface of the vibration isolation platform to perpendicularly extend downward and vertically slidably passes through the first upper support plate, the first spacer, and the lower support plate;
    a plurality of support washers which are inserted onto the main bolt and respectively supported on upper and lower sides of the main bolt with the first upper support plate, the first spacer and the lower support plate interposed between the support washers;
    a plurality of adjusting nuts which are screwed to the main bolt and respectively located on an upper support washer of the support washers and under a lower support washer of the support washers to restrict vertical movement of the first upper support plate, the first spacer and the lower support plate on the main bolt; and
    a plurality of fixing bolts and a plurality of fixing nuts which couple the first upper support plate, the first spacer and the lower support plate to each other and couple the second upper support plate, the second spacer and the lower support plate to each other.

11. A system for monitoring a vibration-isolated foundation, the system comprising:
    an air pressure monitoring system for monitoring air pressure supplied to a plurality of air mounts of the vibration-isolated foundation, wherein the air pressure monitoring system comprises:
        a plurality of air ports configured to receive air to be supplied to the air mounts;
        a plurality of pressure sensors, each of the pressure sensors being configured to measure the pressure of the air supplied to a corresponding one of the air ports and to output the measured pressure as a sensing signal;
        a notification unit configured to operate based on the sensing signal of each of the pressure sensors.

12. The system of claim 11, wherein the notification unit is configured to emit light of a red color when the pressure of the air supplied to the air mounts is outside a normal range.

13. The system of claim 12, wherein the notification unit is configured to emit light of green color when the pressure of the air supplied to the air mounts is within the normal range.

14. The system of claim 13, further comprising an input unit configured to set the normal range.

15. The system of claim 13, further comprising a speaker configured to output a warning sound when the pressure of the air supplied to the air mounts is outside the normal range.

16. The system of claim 13, further comprising communication unit configured to provide a warning message to a predetermined terminal via a wireless communication.

17. The system of claim 16, wherein the wireless communication is one of wireless LAN (WLAN), Wi-Fi, Wibro, Wimax, high speed downlink packet access (HSDPA), long term evolution (LTE), LTE-advanced (LTE-A), Bluetooth, Zigbee, ultra-wideband (UWB), ANT, Wi-Fi and personal area network (PAN).

18. The system of claim 11, further comprising a display unit configured to display a value of the measured pressure.

* * * * *